United States Patent [19]

Lawrence

[11] Patent Number: 4,754,288
[45] Date of Patent: Jun. 28, 1988

[54] PEN CAROUSEL, PEN SENSING AND INDEXING

[75] Inventor: James Lawrence, Irvine, Calif.
[73] Assignee: CalComp, Inc., Anaheim, Calif.
[21] Appl. No.: 86,917
[22] Filed: Aug. 19, 1987
[51] Int. Cl.⁴ .......................... G01D 9/00; G01D 9/30
[52] U.S. Cl. ...................................... 346/29; 346/46; 346/49; 346/139 R; 346/141
[58] Field of Search ................ 346/139 R, 29, 46, 49, 346/141, 140 R, 139 A, 139 B, 139 C

[56] References Cited

U.S. PATENT DOCUMENTS

| | | | |
|---|---|---|---|
| 4,173,020 | 10/1979 | Anderka | 346/141 |
| 4,173,021 | 10/1979 | Züchner | 346/141 |
| 4,518,972 | 5/1985 | Gunderson | 346/139 R |

Primary Examiner—H. Broome
Assistant Examiner—Mark Reinhart
Attorney, Agent, or Firm—Donald A. Streck

[57] ABSTRACT

In a multi-position graphics plotter pen carousel system employing a pen capping mechanism therein at each pen position for capping and uncapping pens held by the carousel, an improvement for allowing the sensing of pen presence at the pen positions and the indexing of the carousel with a single sensor. Each pen capping mechanism is adapted to assume a first position with a pen in the pen position and assume a second position with no pen in the pen position. A plurality of first sensible attributes are associated with respective ones of the pen capping mechanisms for exhibiting a first characteristic when a pen is contained at the associated pen position and for exhibiting a second characteristic when no pen is contained at the pen position. A plurality of second sensible attributes are associated with respective ones of the pen positions for constantly exhibiting the first characteristic. There is a single sensor for sensing the first and second characteristics and for developing a sensible signal at an output thereof indicating whether the first or second characteristic is presently being sensed. The plotter logic is adapted to sense the first sensible attributes and step the carousel between respective ones of the first sensible attributes when sensing pen presence with the sensor and to sense the second sensible attributes and for step the carousel between respective ones of the second sensible attributes when indexing the carousel with the sensing attributes whereby the sensible signal at the output of the sensor indicating the first characteristic indicates the presence of a pen at a pen position of the carousel when sensing the first sensible attributes and indicates the passage of a pen position when sensing the second sensible attributes to count pen positions to index the carousel.

9 Claims, 3 Drawing Sheets

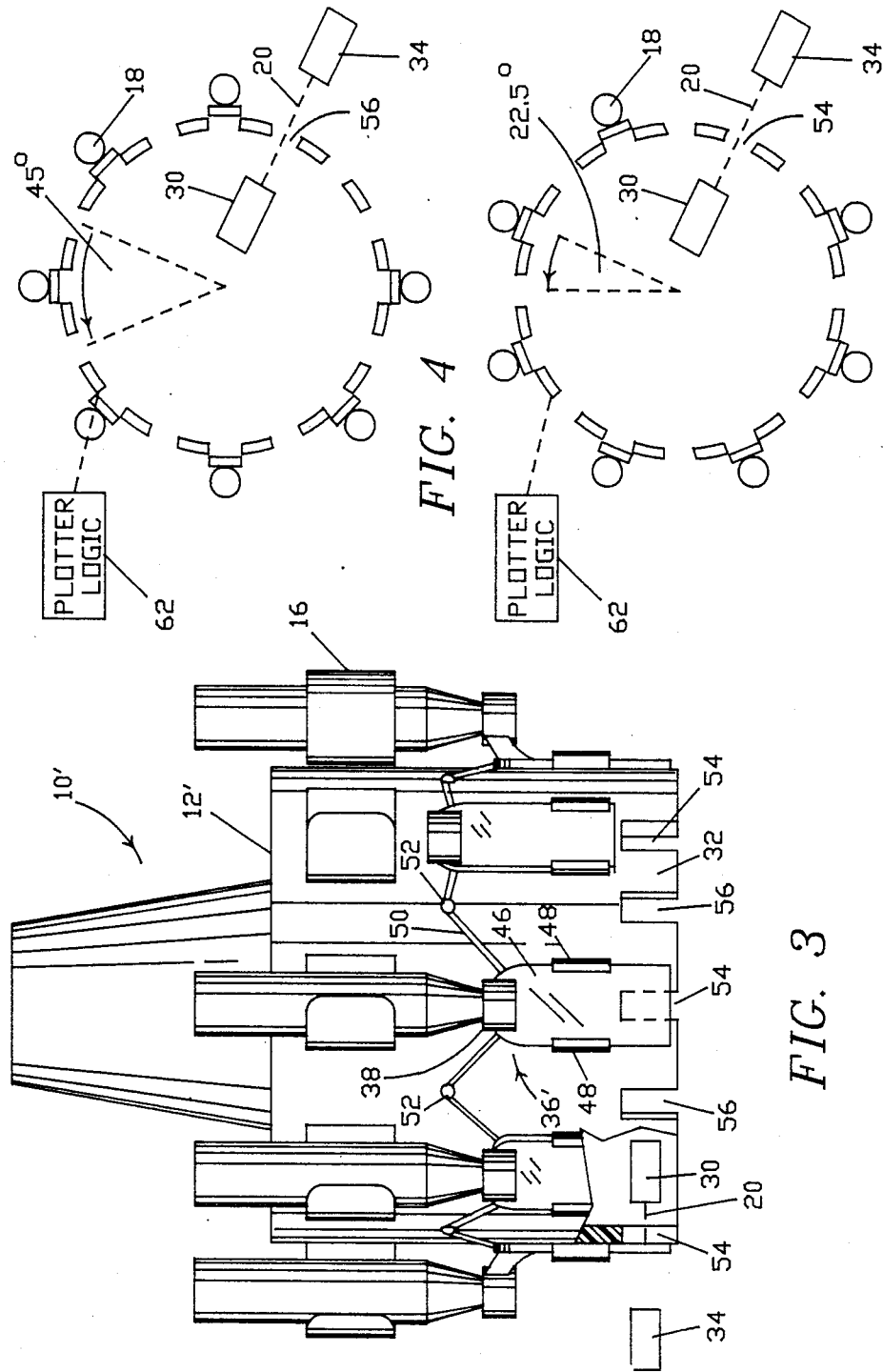

PEN CAROUSEL, PEN SENSING AND INDEXING

BACKGROUND OF THE INVENTION

The present invention relates to multi-pen graphics plotter and, more particularly, in a multi-position graphics plotter pen carousel system employing a pen capping mechanism therein at each pen position for capping and uncapping pens held by the carousel, to the improvement for allowing the sensing of pen presence at the pen positions and the indexing of the carousel with a single sensor comprising, each pen capping mechanism assuming a first position with a pen in the pen position and assuming a second position with no pen in the pen position; a plurality of first sensible means associated with respective ones of the pen capping mechanisms for exhibiting a first characteristic when a pen is contained at the associated pen position and for exhibiting a second characteristic when no pen is contained at the pen position; a plurality of second sensible means associated with respective ones of the pen positions for constantly exhibiting the first characteristic; sensor means for sensing the first and second characteristics and for developing a sensible signal at an output thereof indicating whether the first or second characteristic is presently being sensed; means for positioning the sensor means to sense the first sensible means and for stepping the carousel between respective ones of the first sensible means when sensing pen presence with the sensor means; and, means for positioning the sensor means to sense the second sensible means and for stepping the carousel between respective ones of the second sensible means when indexing the carousel with the sensing means whereby the sensible signal at the output of the sensor means indicating the first characteristic indicates the presence of a pen at a pen position of the carousel when sensing the first sensible means and indicates the passage of a pen position when sensing the second sensible means to count pen positions to index the carousel.

In the field of graphics plotters, the use of a pen carousel for containing a plurality of pens of different types to be employed within the plotting process is popular. Typically, the carousel is removable so that different pen types can be employed by simply removing and replacing the carousel. Such a prior art pen carousel is shown in FIGS. 1 and 2. The carousel 10 comprises a hollow cylindrical body 12 with a hub 14 extending concentrically upward from the top thereof. The hub 14 is adapted to be placed over and lockingly mated with a spindle which is rotated, in turn, to turn the carousel 10 in the performance of its functions. The body 12 has a plurality of equally spaced gripping fingers 16 each adapted to releasably hold a pen 18 for transfer to a penholding mechanism (not shown) which accomplishes the actual drawing employing a pen 18 selected from the carousel 10. Employing the carousel 10, the plotter logic can, at run-time, select from a multitude of different pen tip sizes, types, and ink colors in the creation of the drawing being plotted.

In employing a pen carousel such as 10 of FIGS. 1 and 2, there are two sensing requirements as indicated in the drawings which, heretofore, have been separately accomplished in the mechanism. First, as depicted in FIG. 1, there must be some means for sensing whether or not a selected pen position on the carousel 10 is presently holding a pen 18; that is, at run-time, if pen #5 is selected and the drawing mechanism mechanicaly affects a transfer of a non-existent pen from position #5, the plot will continue without drawing lines for that portion requiring pen #5. Accordingly, a typical prior art approach is to have a reflective surface on the pens 18 from which a light beam 20 from a source 22 will be reflected to a detector 24 when a pen 18 is present in the particular position being sensed. A signal on the output line 26 from the detector 24 can then be employed by the plotter logic to determine whether or not a pen is present. Obviously, without a pen 18 in the associated gripping finger 16, the light beam 20 is not reflected and no signal is developed in detector 24.

The second sensing requirement is depicted in FIG. 2. That is, when pen #5 is selected, which of the plurality of pens 18 is pen #5?. To make this determination, a plurality of equally spaced slots 28 are provided through the sidewalls of the body 12 with one slot 28 for each pen position. A second light source 30 is placed on one side of the sidewalls 32 of the body 12 and a second detector 34 is positioned opposite it on the other side of the sidewall 32 in line with the path of the slots 28 as the carousel 10 is rotated. Accordingly, the light beam 20 from the light source 30 to the detector 34 is interrupted by the sidewalls 32 and allowed to pass by the slots 28. Thus, by starting from a known position and counting the slots 28 associated with the respective positions 18 any desired pen can be found by the plotter logic.

As will be appreciated, the above-described prior art approach requires two sets of light sources and detectors as well as specially equipped pens adapted for the particular sensing system being employed. This is both inconvenient, more complex, and more costly.

Wherefore, it is the object of the present invention to provide a pen carousel providing the ability to sense pen presence and indexing positions with a single set of sensors.

It is another object of the present invention to permit pen sensing in a pen carousel in a manner which does not require pens with special provision for being sensed.

Other objects and benefits of the present invention will become apparent from the description contained hereinafter taken in conjunction with the descriptive drawings thereof.

SUMMARY

The foregoing objects have been attained in a multi-position graphics plotter pen carousel system employing a pen capping mechanism therein at each pen position for capping and uncapping pens in the carousel, by the improvement of the present invention for allowing the sensing of pen presence at a pen position and the indexing of the carousel with a single sensor comprising, each pen capping mechanism assuming a first position with a pen in the pen position and assuming a second position with no pen in the pen position; a plurality of first passageways associated with respective ones of the pen positions and positioned to be blocked by the pen capping mechanism at each pen position when a pen is contained therein and to be unblocked by the pen capping mechanism at each pen position when no pen is contained therein; a plurality of second passageways associated with respective ones of the pen positions and positioned to be unblocked by the pen capping mechanism at each pen position whether or not a pen is contained therein; sensor means for sensing whether the first and second passageways are blocked or unblocked and for developing a sensible signal at an output thereof indicating whether the first and second passageway presently being sensed is blocked or unblocked; means for positioning the sensor means to sense the first passageways and for stepping the carousel between the first passageways when sensing pen presence with the sensing means; and, means for positioning the sensor means to sense the second passageways and for stepping the carousel between the second passageways when indexing the carousel with the sensing means.

In the preferred embodiment, the sensor means comprises means for directing a light beam through the passageways and means for detecting the light beam.

DESCRIPTION OF THE DRAWINGS

FIG. 3 is a partially cutaway side view of a pen carousel according to the present invention.

FIG. 4 is a simplified plan view of the method of operation of the present invention when employing its single sensors to index the carousel.

FIG. 5 is a simplified view in the manner of FIG. 4 showing how the same sensors are employed to determine pen position.

DESCRIPTION OF THE PREFERRED EMBODIMENT

Figures 1, 2:
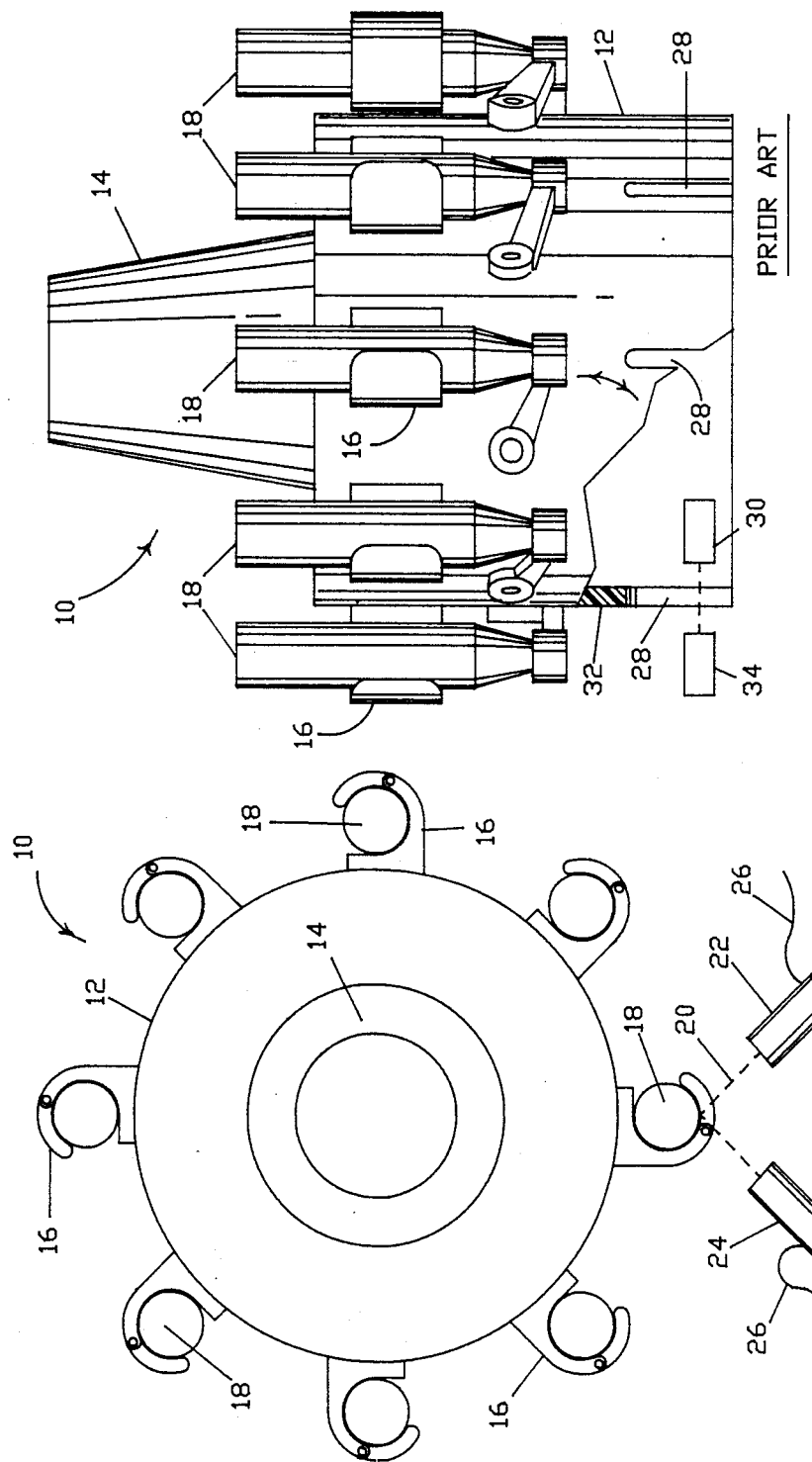
FIG. 1 is a top view of the prior art pen carousel showing the manner of determining pen presence.
FIG. 2 is a partially cutaway side view of the pen carousel of FIG. 1 showing the manner of indexing the carousel in the prior art.

The present invention is based on the using of yet a third function within a pen carousel which, in the prior art, provides no additional beneficial purpose. In the present invention, that function, pen capping, is employed for just such an additional beneficial purpose to solve the objectives of the present invention. Returning momentarily to FIG. 2, typically, liquid ink pens are used as the pens 18 in carousel 10 for the plotting process. Since the writing tips (not shown) of the pens 18 tend to dry out and become inoperative when exposed to air for any extended periods of time, it is common practice to provide a pen-capping mechanism such as that generally indicated as 36 at each pen position to cap the pen tip against evaporation except during times of actual use. A typical prior art pen capping mechanism 36 comprises a cap 38 mounted on an arm 40 for pivoting motion about a pivot 42. The cap 38 is adapted to sealably mate with the writing tip of the pen 18 and is held in the raised or capped position as shown in FIG. 2 by some sort of bias member (not shown). As the plotter's pen gripping mechanism (not shown) transfers a pen 18 from carousel 10 to be used in the plotting process, it, simultaneously, interacts with the pen-capping mechanism 36 to rotate the mechanism 36 down and away from the tip of the pen 18 as indicated by the arrow 44 so that the pen 18 can be withdrawn from the gripping fingers 16 without interference from the cap 38. When pen 18 is replaced in the gripping fingers 16, the capping process with mechanism 36 is reversed. It is this heretofore otherwise unused capping mechanism that the present invention employs for the purpose of sensing pen presence without the need for specialized pens.

A carousel 10' according to the present invention is shown in detailed side view in FIG. 3. Those portions of the carousel 10' which correspond to the prior art carousel 10 of FIG. 2 are marked similar numerical designations. Thus, there are the usual plurality of gripping fingers 16 equally positioned about the body 12. The rotational distances to be described hereinafter are with respect to an eight pen carousel. Those skilled in the art will appreciate, however, that the radial distances would be modified accordingly if a different number of pens were employed. In the present invention, the pen capping mechanism 36' employs the same sealing cap 38 mounted in this instance on a vertically sliding member 46. Each member 46 is slidably mounted between a pair of guides 48 formed into the body 12 for the purpose. Each member 46 is additionally biased to a raised position by a biasing spring 50 extending around the body 12 and attached to posts 52 also formed into the body 12 for the purpose. Thus, with a pen 18 in position it can be seen that the pen 18 pushes the sliding member 46 to a lowered position whereas in the position wherein no pen is contained in FIG. 3, the sliding member 46 is free to slide to its vertically raised position. For pen sensing purposes, the sidewalls 32 of the body 12' are provided with a plurality of first slots 54 at respective ones of the pen positions to be covered and uncovered by the vertical movement of the sliding member 46. The second light source and detector 30, 34 alone are employed with the present invention and in like manner to the prior art embodiment of FIG. 2, are positioned on either side of the sidewalls 32 adjacent the bottom of the body 12' so as to have the first slots 54 and sliding members 46 (when in their lowered position) pass therebetween. Thus, as can be seen in FIG. 3 at the left side of the figure as it is viewed, the lowered sliding member 46 blocks the light beam 20 when a pen 18 is in the position.

For indexing purposes, a plurality of second slots 56 are disposed between the first slots 54. The way in which the present invention works is shown in simplified form in FIGS. 4 and 5. By again starting from a known point, and rotating the carousel 10' in 45° increments from second slot 56 to second slot 56, the light source 30 and detector 34 can be employed to count indexing positions as represented by the slots 56. By rotating the carousel 10' and additional 22.5° from a slot 56 indicating a desired pen position, the adjacent slot 54 associated with the pen position is placed between the light source 30 and detector 34 whereby the same light source 30 and detector 34 can be employed to now detect whether or not a pen is present in the position.

In use, as shown in simplified form in FIGS. 4 and 5, the plotter logic 62 positions the carousel 10' with the second slots 56 positioned to be sensed by the light source 30 and detector 34 as shown in FIG. 4 when it desires to index the carousel. By stepping the carousel 10' from second slot 56 to second slot 56 (in this case in 45° steps) and sensing the second slots 56, the logic 62 can index the carousel 10' to a desired pen position. By stepping the carousel 10' to the next adjacent first slot 54 associated with the pen position (in this case a 22.5° step) the first slot 54 can be employed by the same light source 30 and detector 34 to sense the presence or absence of a pen at that position. By stepping the carousel 10' from first slot 54 to first slot 54 the logic 62 can check all the pen positions of the carousel 10'.

Figure 6:
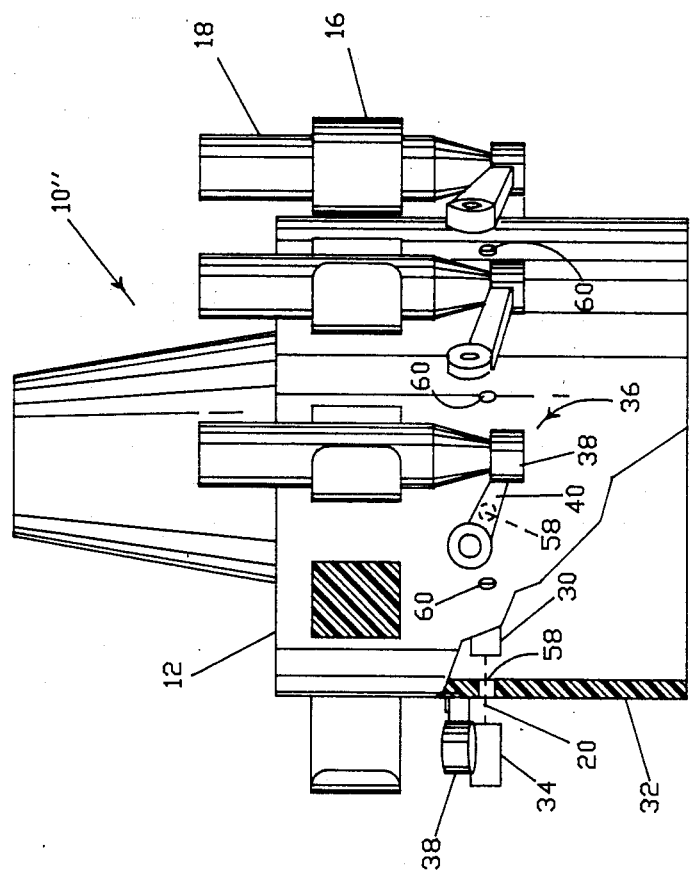
FIG. 6 is an alternate approach to the present invention.

While the present invention employs a modification to the prior art pen capping mechanism 36 of FIG. 2 to accomplish it dual purposes, it does so in order to employ the prior position and manner of use of the light source 30 and detector 34. As those skilled in the art will appreciate, the present invention could have been achieved by retaining the cap 38 mounted on an arm 40 for pivoting motion about a pivot 42 of the prior art pen capping mechanism 36 and, instead, modified the position and manner of use of the light source 30 and detector 34. Such an alternate approach to the present invention is depicted in FIG. 6. In this approach, the first and second slots 54, 56 are replaced by first and second bores 58, 60, respectively, through the sidewall 32 of the carousel 10″. Like the first and second slots 54, 56, the first and second bores 58, 60 are equally spaced. They are positioned higher on the sidewall 32, however so that the first bores 58 are positioned to be covered and uncovered by a portion of the pen capping mechanism 36 as it moves between capping and uncapping positions. For example, as shown in the figure, the arm 40 could be employed for the purpose. The second bores 60 are positioned between the first bores 58 in a position where they will always be uncovered for indexing purposes. In this instance, the light source 30 and detector 34 must be moved from their prior base level position and be positioned higher so as to be aligned with the bores 58, 60. Of course, as will be appreciated by those skilled in the art, if a stop is employed in the pen capping mechanism 36 to prevent its moving upward beyond a given point whether or not a pen is present, that stop will have to be removed for the present invention to work as the pen capping mechanism must have separate sensible positions with and without a pen at the position in order for the present invention to be applicable.

Thus it can be seen by the foregoing invention that the objectives thereof have been truly accomplished by a pen carousel which employs a single set of detectors to both sense pen presence and index the carousel. Also, it can be appreciated from the foregoing description that any pen can be used and be sensed employing the present invention.

Wherefore, having thus described my invention I claim:

1. In a multi-position graphics plotter pen carousel system employing a pen capping mechanism therein at each pen position for capping and uncapping pens held by the carousel, the improvement for allowing the sensing of pen presence at the pen positions and the indexing of the carousel with a single sensor comprising:
   (a) each pen capping mechanism assuming a first position with a pen in the pen position and assuming a second position with no pen in the pen position;
   (b) a plurality of first sensible means associated with respective ones of the pen capping mechanisms for exhibiting a first characteristic when a pen is contained at the associated pen position and for exhibiting a second characteristic when no pen is contained at the pen position;
   (c) a plurality of second sensible means associated with respective ones of the pen positions for constantly exhibiting said first characteristic;
   (d) sensor means for sensing said first and second characteristics and for developing a sensible signal at an output thereof indicating whether said first or second characteristic is presently being sensed;
   (e) means for positioning said sensor means to sense said first sensible means and for stepping the carousel between respective ones of said first sensible means when sensing pen presence with said sensor means; and,
   (f) means for positioning said sensor means to sense said second sensible means and for stepping the carousel between respective ones of said second sensible means when indexing the carousel with said sensing means whereby said sensible signal at said output of said sensor means indicating said first characteristic indicates the presence of a pen at a pen position of the carousel when sensing said first sensible means and indicates the passage of a pen position when sensing said second sensible means to count pen positions to index the carousel.

2. The improvement to a plotter pen carousel system of claim 1 wherein:
   (a) said first sensible means comprises a plurality of first passageways associated with respective ones of the pen positions and positioned to be blocked by the pen capping mechanism at each pen position when a pen is contained therein and to be unblocked by the pen capping mechanism at each pen position when no pen is contained therein;
   (b) said second sensible means comprises a plurality of second passageways associated with respective ones of the pen positions and positioned to be unblocked by the pen capping mechanism at each pen position whether or not a pen is contained therein; and,
   (c) said sensor means comprises means for sensing whether said first and second passageways are blocked or unblocked and for developing a sensible signal at an output thereof indicating whether said first and second passageway presently being sensed is blocked or unblocked.

3. The improvement to a plotter pen carousel system of claim 1 wherein:
   said sensor means comprises means for directing a light beam through said passageways and means for detecting said light beam.

4. In a multi-position graphics plotter pen carousel system employing a pen capping mechanism therein at each pen position for capping and uncapping pens in the carousel, the improvement for allowing the sensing of pen presence at a pen position and the indexing of the carousel with a single sensor comprising:
   (a) each pen capping mechanism assuming a first position with a pen in the pen position and assuming a second position with no pen in the pen position;
   (b) a plurality of first passageways associated with respective ones of the pen positions and positioned to be blocked by the pen capping mechanism at each pen position when a pen is contained therein and to be unblocked by the pen capping mechanism at each pen position when no pen is contained therein;
   (c) a plurality of second passageways associated with respective ones of the pen positions and positioned to be unblocked by the pen capping mechanism at each pen position whether or not a pen is contained therein;
   (d) sensor means for sensing whether said first and second passageways are blocked or unblocked and for developing a sensible signal at an output thereof indicating whether said first and second passageway presently being sensed is blocked or unblocked;
   (e) means for positioning said sensor means to sense said first passageways and for stepping the carousel between said first passageways when sensing pen presence with said sensing means; and, (f) means for positioning said sensor means to sense said second passageways and for stepping the carousel between said second passageways when indexing the carousel with said sensing means.

5. The improvement to a plotter pen carousel system of claim 4 wherein:

said sensor means comprises means for directing a light beam through said passageways and means for detecting said light beam.

6. In a multi-position graphics plotter pen carousel system employing a pen capping mechanism therein at each pen position for capping and uncapping pens in the carousel, the improvement for allowing the sensing of pen presence at a pen position and the indexing of the carousel with a single sensor comprising:

(a) each pen capping mechanism assuming a first position with a pen in the pen position and assuming a second position with no pen in the pen position;

(b) a plurality of sensible means associated with respective ones of the pen positions for indicating the presence of the pen position at a pre-established rotational position of the carousel; and, (c) a single sensor means positioned for sensing and indicating at an output thereof both whether a pen capping mechanism of a pen position disposed at said pre-established rotational position of the carousel is in said first or second position and the presence of said sensible means at said pre-established rotational position of the carousel whereby said output of said sensor means indicates the presence of a pen at a pen position of the carousel when sensing the position of the associated pen capping mechanism and indicates the passage of a pen position when sensing said sensible means to count pen positions.

7. The improvement to a plotter pen carousel system of claim 6 wherein:

said sensor means comprises means for directing a light beam at said sensible means and the pen capping mechanisms and means for detecting said light beam's being passed or blocked by said sensible means and the pen capping mechanisms.

8. In a multi-position graphics plotter pen carousel system having a hollow cylindrical carousel employing a pen capping mechanism on the sidewalls thereof at each pen position for capping and uncapping pens in the carousel, the improvement for allowing the sensing of pen presence at a pen position and the indexing of the carousel with a single sensor comprising:

(a) each pen capping mechanism assuming a first position with a pen in the pen position and assuming a second position with no pen in the pen position;

(b) a plurality of first slots through the sidewalls of the carousel associated with respective ones of the pen positions, said first slots being blocked by its associated pen capping mechanism when the pen capping mechanism is in said first position and being unblocked by its associated pen capping mechanism when the pen capping mechanism is in said second position;

(c) a plurality of second slots through the sidewalls of the carousel between said first slots associated with respective ones of the pen positions, said second slots being unblocked by its associated pen capping mechanism whether the pen capping mechanism is in said first or second position;

(c) light beam producing means positioned for directing a light beam through said first and second slots at a pre-established rotational position of the carousel; and, (d) a single sensor for sensing said light beam and for indicating by a signal at an output thereof both whether a pen capping mechanism of a pen position disposed at said pre-established rotational position of the carousel is in said first or second position and the presence of a said second slot at said pre-established rotational position of the carousel whereby said signal at said output of said sensor indicates the presence or absence of a pen at a pen position of the carousel when sensing said first slots and indicates the passage of a pen position when sensing said second slots to count pen positions.

9. The improvement to a plotter pen carousel system of claim 8 wherein:

each pen capping mechanism includes a sliding member which is slid over said first slots associated with the pen capping mechanism when a pen is in the position.

* * * * *